(12) United States Patent
Li

(10) Patent No.: US 12,120,388 B2
(45) Date of Patent: Oct. 15, 2024

(54) RESOURCE INTERACTING METHOD, APPARATUS, COMPUTER DEVICE, AND READABLE STORAGE MEDIUM

(71) Applicant: Beijing Zitiao Network Technology Co., Ltd., Beijing (CN)

(72) Inventor: Zhaoying Li, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/356,876

(22) Filed: Jul. 21, 2023

(65) Prior Publication Data

US 2023/0362438 A1  Nov. 9, 2023

Related U.S. Application Data

(63) Continuation of application No. PCT/CN2022/071818, filed on Jan. 13, 2022.

(30) Foreign Application Priority Data

Jan. 29, 2021 (CN) .......................... 202110129889.3

(51) Int. Cl.
*H04N 21/442* (2011.01)
*H04N 21/431* (2011.01)

(52) U.S. Cl.
CPC ... *H04N 21/44213* (2013.01); *H04N 21/4312* (2013.01)

(58) Field of Classification Search
CPC .............. H04N 21/44213; H04N 21/4312
(Continued)

(56) References Cited

U.S. PATENT DOCUMENTS

2017/0171356 A1\* 6/2017 Ji ........................... H04L 67/10
2017/0220216 A1  8/2017 Thompson et al.
(Continued)

FOREIGN PATENT DOCUMENTS

CN  108769814 A  11/2018
CN  109858215 A   6/2019
(Continued)

OTHER PUBLICATIONS

CN 109858215A_Resource Acquisition, Sharing Processing Method, Device, Storage Medium and Apparatus by Xie et al. (Year: 2017).\*
(Continued)

*Primary Examiner* — Nathan J Flynn
*Assistant Examiner* — Caroline Somera
(74) *Attorney, Agent, or Firm* — Astute IP Law Group

(57) ABSTRACT

A resource interacting method and an apparatus, a computer device, and a readable storage medium is provided. The resource interacting method includes acquiring display data corresponding to user attribute information, in which, the display data includes a resource interactive video and an associated interactive video; displaying a resource claiming component and the resource interactive video within an interactive page in response to a resource claiming trigger event, in which, a content of the resource interactive video is associated with the resource claiming component; detecting a trigger operation result for the resource claiming component; and displaying the associated interactive video corresponding to the trigger operation result within the interactive page. The resource interacting method according to the disclosed embodiments can combine the process of obtaining resources with the interaction process, enhancing the fun of resource acquisition and user engagement.

20 Claims, 7 Drawing Sheets

(58) Field of Classification Search
USPC .......................................................... 725/39
See application file for complete search history.

(56) References Cited

U.S. PATENT DOCUMENTS

| | | | |
|---|---|---|---|
| 2017/0311021 A1 | 10/2017 | Peng | |
| 2017/0324859 A1* | 11/2017 | Xiao | H04L 51/04 |
| 2018/0152767 A1* | 5/2018 | Liu | H04N 21/4781 |
| 2018/0174369 A1* | 6/2018 | Ma | G06V 20/20 |
| 2019/0073240 A1* | 3/2019 | Chen | G06T 13/80 |
| 2019/0090003 A1 | 3/2019 | Hardy et al. | |
| 2020/0322683 A1* | 10/2020 | Zhang | H04N 21/4667 |
| 2020/0336804 A1* | 10/2020 | Cui | H04N 21/4781 |
| 2021/0266631 A1* | 8/2021 | Geng | H04N 21/431 |
| 2022/0053221 A1* | 2/2022 | Zhang | H04N 21/4307 |
| 2022/0201364 A1* | 6/2022 | Kong | H04N 21/4788 |
| 2022/0286716 A1* | 9/2022 | Zhou | G06V 20/41 |
| 2022/0377157 A1* | 11/2022 | Wu | H04N 21/475 |
| 2022/0377426 A1* | 11/2022 | Wei | H04N 21/4788 |
| 2022/0395749 A1* | 12/2022 | Han | A63F 13/355 |
| 2023/0026096 A1* | 1/2023 | Zheng | H04N 21/47815 |
| 2023/0124461 A1* | 4/2023 | Lin | H04N 21/4788 |
| | | | 715/708 |

FOREIGN PATENT DOCUMENTS

| | | | | |
|---|---|---|---|---|
| CN | 110753235 A | 2/2020 | | |
| CN | 110784752 A | 2/2020 | | |
| CN | 111882309 A | 11/2020 | | |
| CN | 113891134 A | 1/2022 | | |
| JP | 2008188295 A | 8/2008 | | |
| JP | 2020510940 A | 4/2020 | | |
| JP | 2020534631 A | 11/2020 | | |
| WO | 2013152420 A1 | 10/2013 | | |
| WO | WO-2020048495 A1 * | 3/2020 | ........ | H04M 1/72466 |

OTHER PUBLICATIONS

Extended European Search report for European Patent Application No. 22745060.8, mailed May 24, 2024, 8 pages.

Office Action for Japanese Patent Application No. 2023-544643, mailed Jul. 23, 2024, 6 pages.

* cited by examiner

RESOURCE INTERACTING METHOD, APPARATUS, COMPUTER DEVICE, AND READABLE STORAGE MEDIUM

This application is a continuation of International Patent Application No. PCT/CN2022/071818, filed on Jan. 13, 2022, which claims priority of Chinese Patent Application No. 202110129889.3 filed on Jan. 29, 2021. The entire disclosure of the aforementioned applications is incorporated by reference as part of the disclosure of this application.

TECHNICAL FIELD

Embodiments of the present disclosure relate to a resource interacting method and an apparatus, a computer device, and a readable storage medium.

BACKGROUND

With continuous development of various application products, entertainment of products and interaction with users has become important factors affecting the number of product users and a usage rate. In order to promote activities or increase the number of users, providing resources to users has become a common way of activity, with acquired resources as participation rewards, so as to improve user engagement of application products.

SUMMARY

Embodiments of the present disclosure provides a resource interacting method and an apparatus, a computer device, and a readable storage medium.

According to an aspect of the present disclosure, a resource interacting method is provided. The method includes: acquiring display data corresponding to user attribute information, wherein, the display data includes a resource interactive video and an associated interactive video; displaying a resource claiming component and the resource interactive video within an interactive page in response to a resource claiming trigger event, wherein, a content of the resource interactive video is associated with the resource claiming component; detecting a trigger operation result for the resource claiming component; and displaying the associated interactive video corresponding to the trigger operation result within the interactive page.

According to another aspect of the present disclosure, a resource interacting apparatus is provided. The apparatus includes: a transmitting unit, configured to acquire display data corresponding to user attribute information, wherein, the display data includes a resource interactive video and an associated interactive video; a display unit, configured to display a resource claiming component and a resource interactive video on an interactive page in response to a resource claiming trigger event, wherein, a content of the resource interactive video is associated with the resource claiming component; a detecting unit, configured to detect a trigger operation result for the resource claiming component; wherein, the display unit is further configured to: display an associated interactive video corresponding to the trigger operation result within the interactive page.

According to yet another aspect of the present disclosure, a computer device is provided. The computer device includes: a processor, a memory, and a computer program stored on the memory, in which, the processor executes the computer program to implement the steps of the above-mentioned resource interacting method.

According to yet another aspect of the present disclosure, a computer readable storage medium is provided. The computer readable storage medium has a computer program stored thereon. The computer program implements, upon executed by a processor, the steps of the above-mentioned resource interacting method.

BRIEF DESCRIPTION OF THE DRAWINGS

In order to provide a clear explanation of the disclosed embodiments or technical solutions in the prior art, a brief introduction will be given to the accompanying drawings required in the description of the embodiments or prior art. It is obvious that the accompanying drawings in the following description are only some embodiments of the present disclosure. For ordinary technical personnel in the art, other accompanying drawings can be obtained based on these drawings without any creative effort.

DETAILED DESCRIPTION

The technical solutions in the embodiments of the present disclosure will be described clearly and completely with reference to the drawings in the embodiments of the present disclosure. Apparently, the described embodiments are only part of the embodiments of the present disclosure, not all of them. Based on the embodiments in the present disclosure, all other embodiments obtained by those ordinary skilled in the art without creative labor belong to the scope of the present disclosure.

The terms "first", "second" and similar terms used in the present disclosure do not indicate any order, amount or importance, but are only used to distinguish different components. Similarly, terms such as "including" or "comprising" mean that elements or objects appearing before the term cover elements or objects listed after the term and their equivalents, without excluding other elements or objects. Terms such as "connecting" or "connection" are not limited to physical or mechanical connection, but can include electrical connection, whether direct or indirect.

Figure 1:
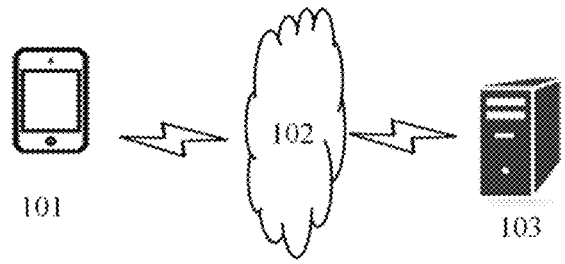
FIG. 1 shows a schematic diagram of an application scenario of an interactive system according to at least one embodiment of the present disclosure.

FIG. 1 shows a schematic diagram of an application scenario of an interactive system according to at least one embodiment of the present disclosure, including a terminal device 101, a network 102, and a server 103.

The terminal device 101 may be either a mobile terminal shown or a fixed terminal, and performs data transmission with the server 103 through the network 102. The terminal device 101 may be installed thereon with various applications, for example, web browser applications, search applications, video playback applications, news and information applications, etc. In addition, the terminal device 101 includes input/output apparatuses, and thus may also receive user operations, for example, receive touch, gesture operations, etc. of a user through a touch screen or a touchpad, or receive voice operations of a user through a microphone. Then, the terminal device 101 may generate a request message based on the received operations. Via the network 102, the terminal device 101 may send the above-described request message to the server 103, and receive data returned by the server 103 in response to the request message. The terminal device 101 may display according to the data returned by the server 103, for example, the terminal device 101 may display the received display data, such as a video or an image, for example, on the display screen of the terminal device 101, according to the data returned by the server 103. In addition, the received data may further include other information, for example, display time point and display duration of the video. Alternatively, the server 103 may also directly send data to the terminal device 101 without receiving the request message, so as to perform processing accordingly on the terminal device 101.

The terminal device 101 may be in a hardware or software form. When the terminal device 101 is in the hardware form, it may be various electronic devices having a display screen and supporting program operation, including but not limited to smartphones, smart TVs, tablet personal computers, e-book readers, Moving Picture Experts Group Audio Layer IV (MP4) players, laptops, desktops, etc. When the terminal device 101 is in the software form, it may be installed in the electronic devices as listed above, and may be implemented as a plurality of pieces of software or software modules (e.g., software or a software module for supplying distributed services), or may also be implemented as a single piece of software or a software module, which will not be specifically limited here.

The network 102 may be a wired network or a wireless network, which will not be limited here. The server 103 may be a server that provides various services, for example, receiving a data stream sent by the terminal device 101 and caching the same. In addition, the server 103 may also receive a request message sent by the terminal device 101, analyze the request message, and send the analysis result (e.g., a data stream corresponding to request information) to the terminal device 101. Different servers may be arranged according to different application types, for example, the server 103 may be an instant communication server, a payment application server, an information exhibiting application server, a resource management server, etc.

It may be understood that the number of terminal devices 101, networks 102, and servers 103 shown in FIG. 1 is only illustrative. According to actual application scenarios, there may be any number of terminal devices, networks, and servers.

In an activity process such as product promotion and user engagement improvement, the application platform party (e.g., which may be implemented as the server 103 in FIG. 1) usually sends resources via the network in a form of applets, links, etc. to a terminal device of a registered or unregistered user (e.g., which may be implemented as the terminal device 101 in FIG. 1), and the acquired resources may be in a form of a red envelope reward or virtual currency. As an example, the application platform party may use the red envelope reward to encourage the user to participate in promotional activities, thereby implementing propaganda objectives such as increasing the number of users and improving product awareness. For example, the user may acquire the resource through a singe click at a fixed time point or a plurality of clicks on the red envelope displayed.

However, the current resource acquisition form (for example, claiming resource by the user) excessively focuses on the resource per se, for example, the user only focuses on the amount of resource rewards that may be acquired, without any interaction with the user. Moreover, the existing resource acquisition form is too simple: the user clicks on a resource link and receives the resource, so that the user focuses only on the amount of resources available, and thus a user participation rate is only affected by a resource quota; if the resource quota of the reward is reduced, it is difficult to attract a user to participate. Therefore, the current activity mode only based on resources lacks interactive appeal for users, and the resource acquisition procedure is only associated with a single click or a plurality of clicks on the control, making it difficult for users to generate a sense of participation and impossible to continuously attract more users to participate. In addition, such a resource acquisition mode lack of attractiveness will also result in failure to implement the platform's promotion objectives.

The present disclosure provides a resource interacting method that adds a user interaction procedure during a resource acquisition procedure, and is capable of exhibiting an interactive video accordingly based on a trigger operation of a user. A resource may represent a virtual resource; and the virtual resource may include various types such as virtual currency, virtual gold, virtual share, virtual fund, virtual bond, virtual gift, virtual pet, virtual equipment, etc. Therefore, the method according to the present disclosure may also be applied to other types of resources. The interactive video exhibited during the resource acquisition procedure is associated with the trigger operation of the user, for example, displaying different video data for different operation results, and implementing a combination of resource acquisition and display interaction, thereby enhancing the user's sense of participation while enhancing entertainment and attraction.

Figure 2:
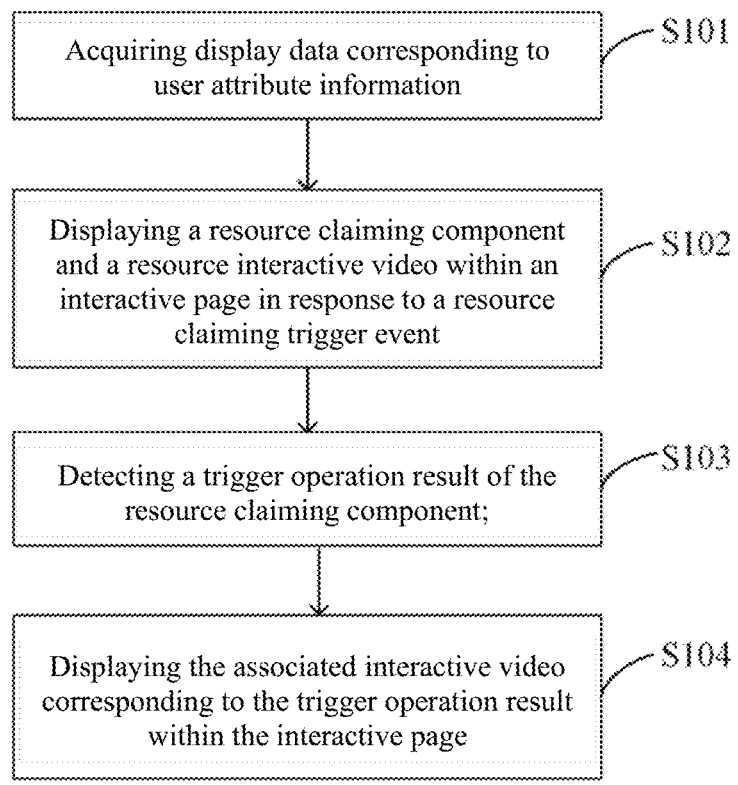
FIG. 2 shows a schematic flow chart of a resource interacting method provided according to some embodiments of the present disclosure.

FIG. 2 shows a schematic flow chart of a resource interacting method according to embodiments of the present disclosure; and the resource interacting method provided according to the present disclosure will be described below in conjunction with FIG. 2.

As shown in FIG. 2, the interacting method according to the present disclosure may include steps S101 to S104. In at least some embodiments, the interacting method may be executed by the terminal device 101 as shown in FIG. 1. In step S101, display data corresponding to user attribute information is acquired, wherein, the display data includes a resource interactive video and an associated interactive video. In the resource interacting method according to the present disclosure, the displayed interactive video is associated with the user attribute information, and thus is capable of implementing specialization of interactive content; users having different attribute information may receive interactive videos with different contents, thereby enhancing user diversity of resource interaction and enhancing interactive entertainment.

Hereinafter, the resource interacting method provided according to the present disclosure will be described in detail by taking resource acquisition in a video playback application as an example.

In step S102, a resource claiming component and a resource interactive video are displayed within an interactive page in response to a resource claiming trigger event, wherein, a content of the resource interactive video is associated with the resource claiming component, and the specific content of the resource interactive video will be described below. For example, the interactive page may be exhibited on a display screen of the terminal device in a form of pop-up window, picture in picture, etc. In addition, the interactive page may be displayed in a full screen manner, that is, completely cover the display screen, or the interactive page may only cover a portion of the display screen, which will not be limited here.

The resource claiming trigger event is an event used to trigger the terminal device to display the resource claiming component and the resource interactive video. The trigger may be understood as a start point that prompts the terminal device to execute a certain procedure or operation. It may be understood that the event may also synchronously trigger cancellation of displaying a guide interactive video.

Figure 3:
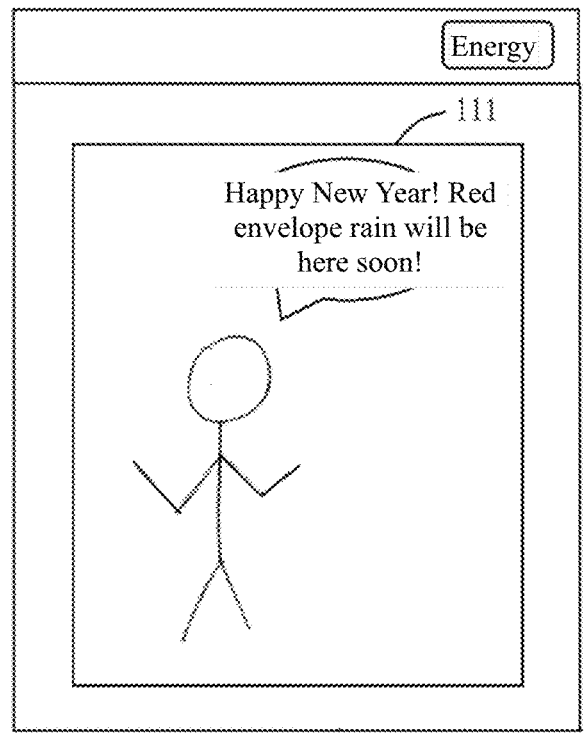
FIG. 3 shows a schematic diagram of displaying a guide interactive video according to embodiments of the present disclosure.

The resource interacting method according to the embodiment of the present disclosure may further include: displaying a guide interactive video of the resource claiming component, before displaying the resource claiming component within the interactive page. FIG. 3 shows a schematic diagram of displaying the guide interactive video according to the embodiment of the present disclosure. FIG. 3 schematically shows a display interface of a mobile terminal device, including an interactive page 111 displayed in step S101, and a guide interactive video displayed within the interactive page 111. As an example, the guide interactive video may be a New Year greeting; and through the guide interactive video, a user may learn about an upcoming resource claiming activity. In the example, the guide interactive video per se may serve as a guide video, informing the user of activity content or activity process in a next step, thereby promoting the user to generate a sense of interaction and creating an interactive experience of participating in the activity together with a character in the video.

In some implementation modes according to the present disclosure, the resource claiming trigger event may be a first time period set for the guide interactive video. For example, the resource claiming trigger event may be a display duration of 10 seconds, that is, the first time period is 10 seconds. In this case, after displaying a 10-second guide interactive video, it is triggered to display the resource claiming component and the resource interactive video within the interactive page. In some other implementation modes according to the present disclosure, the resource claiming trigger event for the guide interactive video may also be other modes, for example, detecting any touch operation on the interactive page; and the detection, for example, may be implemented through a touch screen or a touchpad. In this case, for example, the terminal device may firstly display the guide interactive video on the interactive page, and then display the resource interactive video and the resource claiming component upon detecting a touch operation on the interactive page. A specific implementation form of the resource acquisition trigger event will not be limited herein.

In step S102, the displayed resource claiming component is a specific form that may receive user operation information, so as to implement information exchange with the user. For example, the resource claiming component may be implemented in a form of control, in which the user may click (select) the displayed control by touch, and the terminal device receives a user operation based on the control and takes the same as user input information for subsequent processing. For example, the resource claiming component may be an interactive button displayed on the interactive page, and the user may click the button by touch as input information. In addition, the displayed resource claiming component may be a single button or a plurality of buttons. Taking that the resource claiming component is a red envelope button that may receive a click operation as a specific example. For example, a red envelope button may be displayed in a fixed position on the interactive page, and the button may receive one or more clicks from the user. For another example, a plurality of red envelope buttons may be displayed in random positions on the interactive page, that is, a plurality of resource claiming components may be displayed in a form of red envelope rain, which will not be limited here. The resource claiming component may also be implemented as a link to be coupled to a resource claiming result. For another example, the resource claiming component may also be implemented through languages such as HTML and Js, which will not be limited here.

It may be understood that the user involved herein refers to an operator who may operate the terminal device, and the user, for example, may be specific to the terminal device in a way of logging in account information in an application of the terminal device. During a login procedure, the terminal device may send account information to a server, etc. (e.g., a platform party corresponding to the application or referred to as a provider party); the account information may be in a form of name, account, password, account identification, etc., which will not be limited here. As an example, a video playback application may be installed on the terminal device and receive account information entered by the user in the video playback application, to implement the account login procedure. In addition, the terminal device may also send the received account information to the server and receive data sent by the server for the account logged in; for example, the data may include video data for playing on the terminal device and related instruction information for implementing video playback functions.

Figure 4:
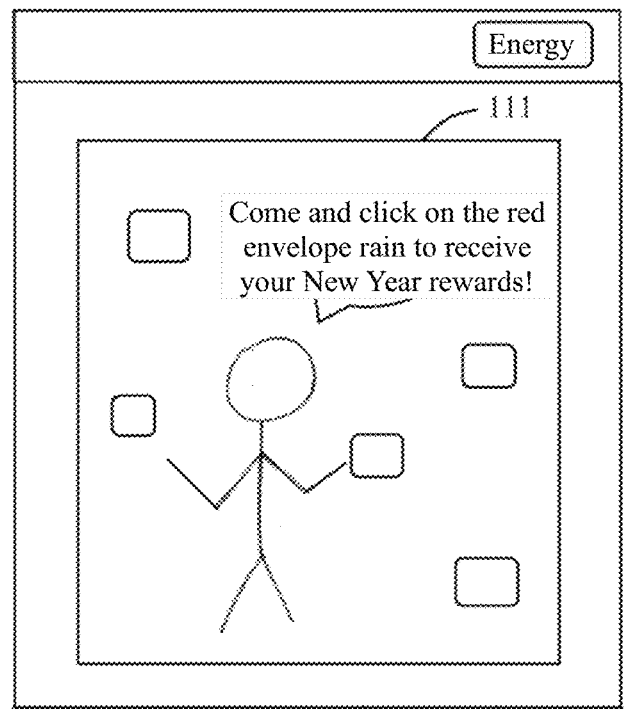
FIG. 4 shows a schematic diagram of displaying a resource interactive video and a resource claiming component according to embodiments of the present disclosure.

As an example, FIG. 4 shows a schematic diagram of displaying the resource interactive video and the resource claiming component according to the embodiment of the present disclosure. An interactive page 111 is schematically shown in FIG. 4; and a resource interactive video and a plurality of square red envelope controls are displayed within the interactive page 111 as the above-described resource claiming components. For example, the resource interactive video may be a clip of video expressed to guide the user to click on the displayed red envelope control;

through the resource interactive video, the user may learn that a red envelope reward may be acquired by clicking on the red envelope control. According to the embodiment of the present disclosure, as compared with the guide interactive video displayed above, the content of the resource interactive video is associated with the resource claiming component; in other words, semantics expressed by the resource interactive video is associated with the resource claiming component, in order to further promote the user to generate a sense of mutual interaction, generate interactive experience of participating in activities with the character in the video, and perform the resource-based interaction procedure step by step as guided by the video content.

Continuing to refer to FIG. 2, in step S103, a trigger operation result of the resource claiming component is detected; and in step S104, the associated interactive video corresponding to the trigger operation result is displayed within the interactive page. The detection may be implemented, for example, through a touch screen or a touchpad. The trigger operation result for the resource claiming component may include two cases: a first operation result of the trigger operation for the resource claiming component is detected on the interactive page, or a second operation result of the trigger operation for the resource claiming component is not detected within a second time period; the second time period may be preset to, for example, 5 seconds. In other words, the first operation result indicates that a user's trigger operation for the resource claiming component is detected, while the second operation result indicates that the user's trigger operation for the resource claiming component is not detected within a preset time period.

According to the interacting method provided by the present disclosure, with respect to different operation results of the user, the terminal device may display different interactive videos accordingly, that is, after displaying the resource claiming component, the interactive video displayed by the terminal device is associated with the user's operation results for the control. The user's input information directly affects the video content displayed in subsequent steps, thereby enriching the user's interactive experience during the procedure of acquiring resources through the resource claiming component. As an example, in a case where the first operation result is detected, the associated interactive video corresponding to the first operation result may be a video content that expresses "Congratulations on receiving a red envelope reward!"; in a case where the second operation result is detected, the associated interactive video corresponding to the second operation result may be a video content that expresses "What are you waiting for? Hurry up and click the red envelope button to receive rewards". The interaction procedures for different trigger operation results will be described in detail below.

In the interacting method described in conjunction with FIG. 2, the user interaction procedure is added during the resource acquisition procedure, which is capable exhibiting the interactive video accordingly based on user trigger operations; that is, the video content exhibited during the resource acquisition procedure is associated with user trigger operations, which implements a combination of resource acquisition and user interaction, thereby increasing the user' interest in participating in resource claiming activities and increasing entertainment of the activities.

According to some embodiments of the present disclosure, before proceeding to the above-described step S101, the interacting method may further include: detecting a resource processing trigger event within a display page. The resource processing trigger event is an event used to trigger entry into the resource interaction activity, for example, as an implementation mode for triggering the terminal device to proceed to step S101. The interacting method according to the present disclosure may further include: sending a resource acquisition request and receiving interactive data. For example, after detecting the resource processing trigger event, the terminal device may send the resource acquisition request to the server, to indicate that the account currently logged in wishes to participate in the resource interaction activity; in response to the request, the server may send data related to the resource interaction activity to the terminal device, and the terminal device may execute the interaction processing steps. For example, the interactive data may include display data and an exhibition instruction; and the exhibition instruction is used to indicate exhibition of the above-described interactive page on the display page of the terminal device.

According to embodiments of the present disclosure, the resource processing trigger event may include at least one of: triggering a scheduled video within a display page, triggering an activity control within a display page, and displaying a scheduled video or an activity control at a predetermined time interval.

In a case where the resource processing trigger event is triggering a scheduled video within the display page, for example, the server may send the scheduled video as an activity entry to the terminal device, so that the user is capable of participating in the resource interaction activity (e.g., red envelope interaction) through a video playback application; the user may click on the displayed scheduled video to implement the resource processing trigger event, in other words, after detecting a touch operation for the displayed scheduled video, the terminal device will send the above-described resource acquisition request to the server. Alternatively, the resource processing trigger event may be triggering an activity control within the display page, that is, taking the activity control as an activity entry. In addition, except displaying the scheduled video or the activity control through active touch by the user, the resource processing trigger event may also be displaying the scheduled video or the activity control at a predetermined time interval, without user operations. As an example, after displaying the 20-second scheduled video, the terminal device will be directly triggered to send the resource acquisition request. In this case, if the user currently does not wish to participate in resource interaction, he/she may stop displaying the scheduled video through any operation (e.g., a sliding operation), so as not to trigger the step of sending the resource acquisition request. Implementation of the resource processing trigger event may also be in other forms, for example, a link address, which will not be limited here.

Figure 5:
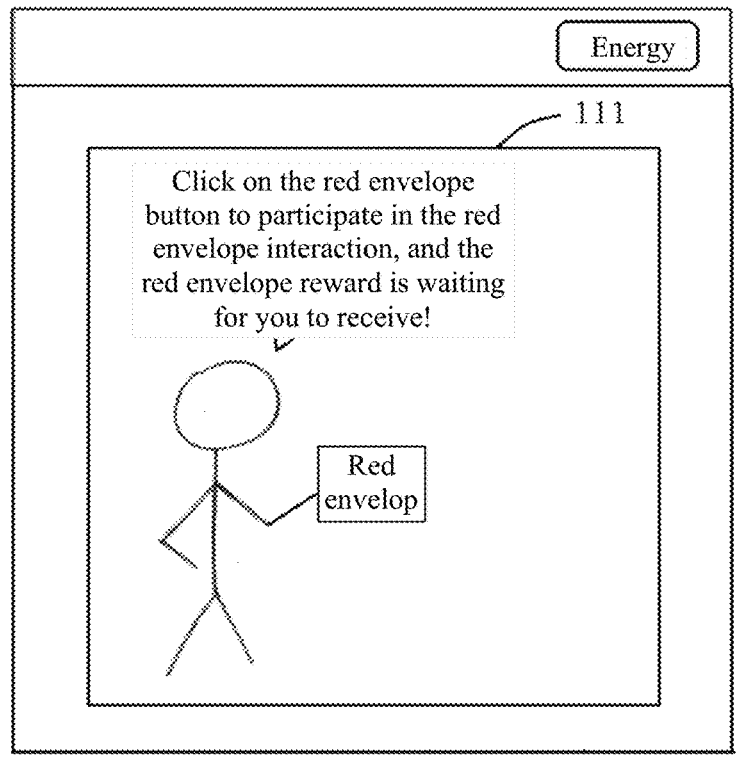
FIG. 5 shows a schematic diagram of displaying a scheduled video and an activity control according to embodiments of the present disclosure.

As an example, FIG. 5 shows a schematic diagram of displaying a scheduled video and an activity control according to embodiments of the present disclosure. The interactive page 111 is schematically shown in FIG. 5, and the scheduled video and the activity control are displayed within the interactive page 111. Wherein, the scheduled video may be a resource activity guide phrase (e.g., "Click on the red envelope button, participate in red envelope interaction, red envelope rewards are waiting for you to claim!"), and the activity control is a square control displayed. Through the scheduled video, the user may learn that by clicking the red envelope button, he/she may enter the resource claiming activity page.

Optionally, taking the scheduled video as the resource claiming activity entry as an example, the server may also control time for sending the scheduled video to the terminal device. For example, the server may only send the scheduled video to the terminal device within a preset time period, and no more scheduled video will be sent in any time period other than the preset time period. Wherein, the preset time period may be holidays (weekends, New Year's Day, Spring Festival, Labor Day, Children's Day, Dragon Boat Festival, etc.), a fixed time period of each day (e.g., 18:00 to 21:00), or the preset time period may also be specific to the login account information, for example, the user's birthday or a special date set by the user. Further, within the preset time period, the server may send a resource claiming activity entry multiple times to the terminal device, attracting the user to participate in resource interaction multiple times. In addition, if a user refuses to enter the activity in a case where the scheduled video has been displayed multiple times, the terminal device may send a request message to the server, so as to stop sending the entry, thereby avoiding activity promotion from affecting application use experience of the user.

According to some embodiments of the present disclosure, the resource interacting method may further include: acquiring user attribute information. As an example, the user attribute information may include at least one of: user location information, festival information, user level information, and season information. The user location information may represent location information of the above-described terminal device, or may also be location information set by the user. As an example, the above-described resource acquisition request may include the acquired user attribute information. In this case, the terminal device also acquires the user attribute information of the account or the device, and sends the user attribute information along with the resource acquisition request to the server. Based on the received user attribute information, the server may accordingly provide display data for resource acquisition interaction and associated with user attribute information.

According to other embodiments of the present disclosure, the resource interacting method may further include: sending the acquired user attribute information in response to the received attribute information request. In this case, the server may actively request the user attribute information from the terminal device. The terminal device sends the user attribute information in response to the received request.

For example, in a case where the user attribute information includes user location information, different video content may be displayed based on the location information. For example, a plurality of activity regions may be divided according to factors such as cultural characteristics and geographical location characteristics in different regions of the country, and video contents displayed for users in different activity regions are different. The regions may be divided based on administrative divisions, or may also be based on geographical location, which will not be limited here. Based on the received location information, the server may provide display data in a targeted manner. As an example, video content differences among different activity regions may be reflected in aspects such as video characters (e.g., public figures having regional characteristics), dialects, festival customs, etc. For example, with respect to users in a first region divided, a character in the guide interactive video, the resource interactive video, and the associated interactive video received is a first character associated with the first region, while with respect to users in a second region divided, a character in the guide interactive video, the resource interactive video, and the associated interactive video received is a second character associated with the second region. That is, different regional characteristics are reflected through different characters in the video.

In addition, the user attribute information may further include one or more of holiday information, user level information, and season information as described above, so as to provide interactive video content having festival characteristics, season characteristics, and user exclusivity.

In the interacting method according to the present disclosure, the user attribute information is combined with the video content, and such resource interaction is capable of highlighting differences in user attributes, and narrowing a distance with the user, and is favorable for promoting the user to participate in the resource interaction activity not only because of attractiveness of claiming resources but also because of the video content he/she is interested in.

Hereinafter, a mode of acquiring the user attribute information will be specifically described by taking the user attribute information as user location information.

In some implementation modes, the acquired location information may be coordinate information used to indicate a current position of the terminal device, such as position coordinates acquired through positioning apparatuses within the terminal device (e.g., positioning apparatuses such as GPS, Beidou, etc.). With position authorization, the terminal device may obtain the positioning coordinates of the positioning apparatus and send the same to the server as location information.

In other implementation modes, the location information may also be information that represents a geographic location expected by the user to engage in the interactive activity. For example, the location information may be acquired based on information input from an input panel of the terminal device. The user may type in the location information through the input panel, for example, "Wuhan", and confirm the typed information through a confirmation button, etc. Next, the terminal device may send the location information acquired through the input panel to the server. For another example, the terminal device receives voice through a voice acquiring apparatus and determines the location information based on the received voice. For example, the user may input voice corresponding to "Wuhan" through a voice input button, and then confirm the location information based on voice recognition through the confirmation button. Next, the terminal device may send the location information acquired through the voice acquiring apparatus to the server. In the above implementation mode, the obtained location information is the geographic information input by the user, that is, represents the geographic information expected by the user to perform the interaction activity.

In other implementation modes, the location information may be pre-stored in a memory of the terminal device. In this case, after obtaining authorization, the terminal device may directly send the stored location information to the server.

According to some embodiments of the present disclosure, in a case where the trigger operation result is that the first operation result of the trigger operation for the resource claiming component is detected on the interactive page, the displaying the associated interactive video corresponding to the trigger operation result within the interactive page, includes: displaying the first interactive video corresponding to the first operation result within the interactive page, wherein, content of the first interactive video is used to encourage further triggering the resource claiming component. The first interactive video displayed in the step is directly related to the trigger result of the user for the resource claiming component.

In addition, it may be understood that the guide interactive video, the resource interactive video, and the first interactive video mentioned herein are categorized based on the content expressed in the video; as the resource claiming activity progresses, a different video content is displayed in a different stage, so as to reflect an interactive attribute. In terms of data format, the videos such as the guide interactive video, the resource interactive video, and the first interactive video may be implemented as a clip of continuous video.

Figure 6A:
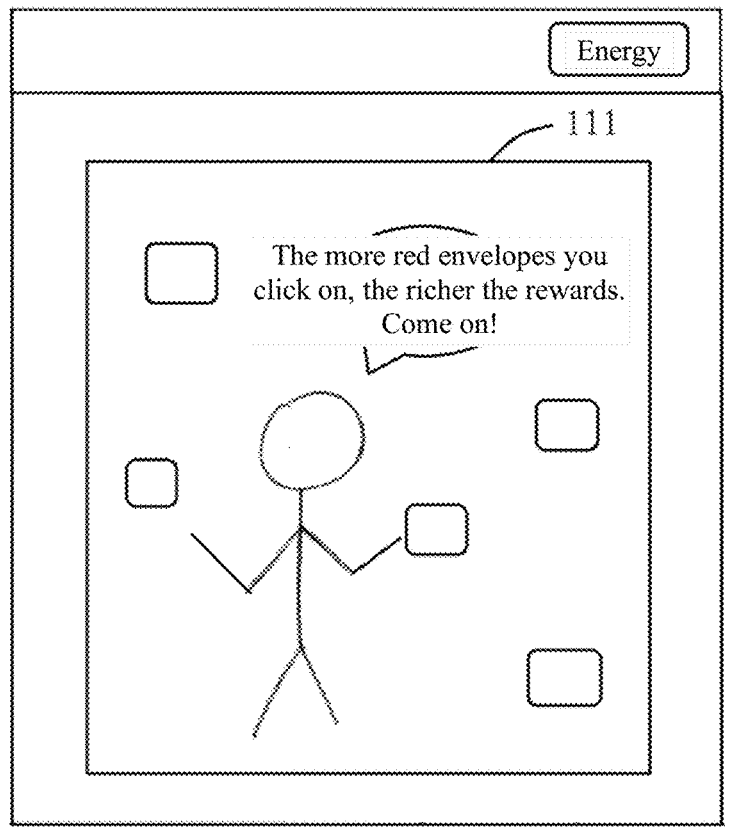
FIG. 6A shows a schematic diagram of displaying a first interactive video according to embodiments of the present disclosure.

FIG. 6A shows a schematic diagram of displaying a first interactive video according to embodiments of the present disclosure, wherein, the semantics expressed in the first interactive video may be used to guide the user who has clicked on the resource claiming component to further click on the red envelope control, for example, the semantics expressed in the first interactive video may be "The more red envelopes clicked, the richer the rewards, come on!", thereby implementing an interactive effect between the video content and click operations; based on the first interactive video displayed, the user may be encouraged to give clicks on the red envelope control displayed simultaneously with the third video.

According to some embodiments of the present disclosure, the interacting method may further include: counting the number of triggers for the resource claiming component on the interactive page, within the display time period of the resource claiming component. The display time period may be preset, and is used to determine a duration of displaying the resource claiming component, for example, 20 seconds; during the display time period, the resource claiming component will be displayed on the interactive page, and exhibition of the resource claiming component will be canceled after the display time ends.

Based on the number of triggers counted, the interacting method according to the embodiment of the present disclosure may further include: displaying a resource acquisition object corresponding to the number of triggers; displaying resource information in response to triggering the resource acquisition object; and adding a resource corresponding to the resource information to the resource account. The resource acquisition object is used to receive user operations such as clicking or touching, which, for example, may be implemented in a form of control, button, or link, so as to determine whether the user agrees to claim the resource; and the resource information may represent information related to the claimed resource, so as to prompt the user that the resource has been claimed. The resource account may be an account for storing resources; and the account may be specific to the user's login information and has exclusivity. As an example, based on identification of a resource account, resources may be transferred to or from the resource account.

Figure 6B:
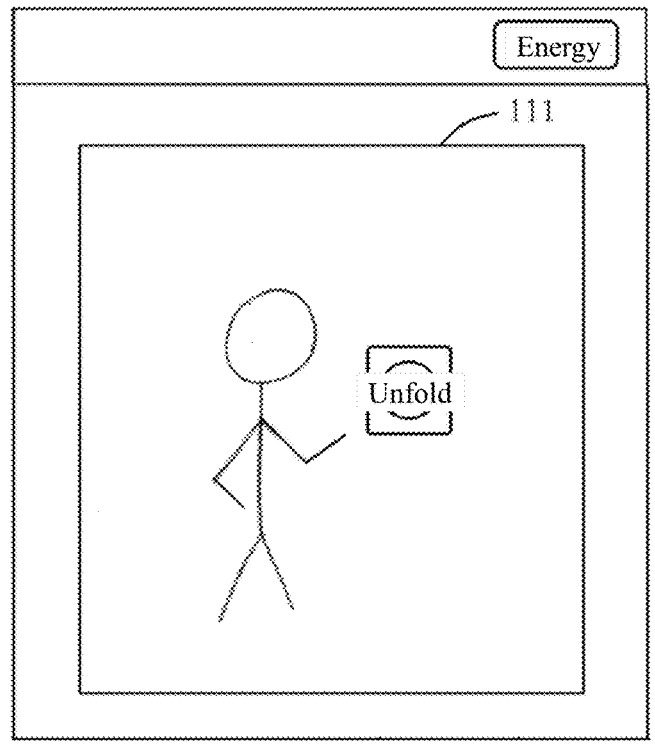
FIG. 6B shows a schematic diagram of displaying a resource acquisition object according to embodiments of the present disclosure.
Figure 6C:
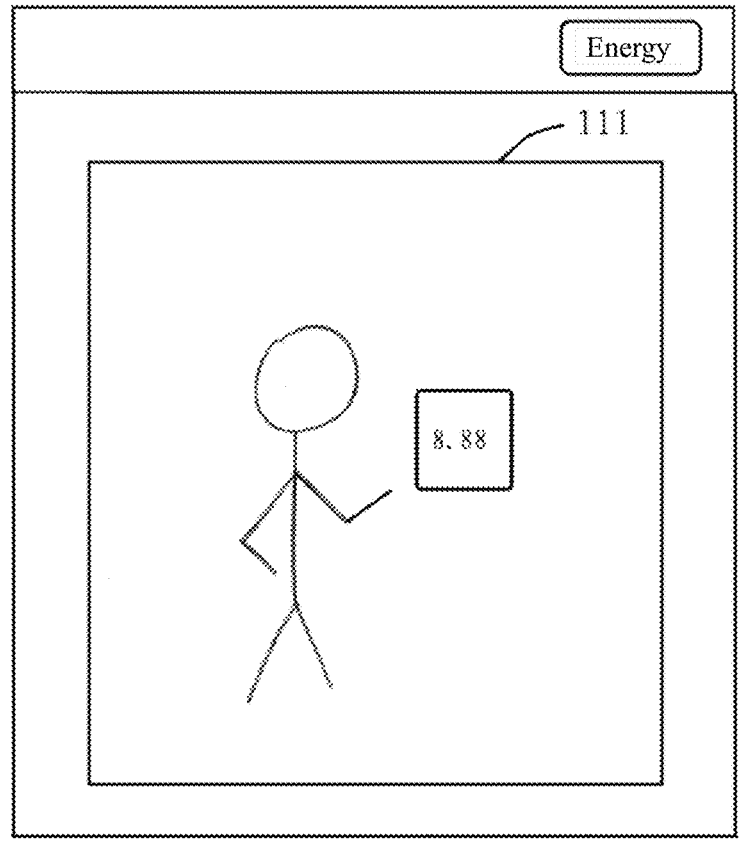
FIG. 6C shows a schematic diagram of displaying resource information according to embodiments of the present disclosure.

FIG. 6B shows a schematic diagram of displaying a resource acquisition object according to embodiments of the present disclosure; and FIG. 6C shows a schematic diagram of displaying resource information according to embodiments of the present disclosure. As shown in FIG. 6B, the resource acquisition object is represented as a claim control having a word "Unfold". By clicking on the control, the user may implement the operation of claiming the resource. Next, after clicking the claim button, the interactive page may display the resource information shown in FIG. 6C, such as "8.88", to prompt the user that he/she has claimed a resource corresponding to "8.88". For example, in this case, the server may transfer the resource corresponding to the resource information to the account logged in on the terminal device. In addition, the number of resources obtained may be directly determined after selecting (or clicking) a resource object such as a red envelope control, a button, or a link, or may also be reallocated and determined after calculating other resource information, which will not be limited here.

According to other embodiments of the present disclosure, in a case where the trigger operation result is that the second operation result of the trigger operation for the resource claiming component is not detected within the second time period, the displaying the associated interactive video corresponding to the trigger operation result within the interactive page, includes: displaying a second interactive video corresponding to the second operation result within the interactive page, wherein, a content of the second interactive video is used to guide triggering the resource claiming component. The second interactive video displayed in the step is directly related to the trigger result of the user for the resource claiming component. In other words, the video content of the second interactive video displayed for the second operation result is different from the above-described video content of the first interactive video displayed for the first operation result, which thus reflects differential display caused by the user operation, and implements interactivity between the displayed video content and the user operation.

Figure 7A:
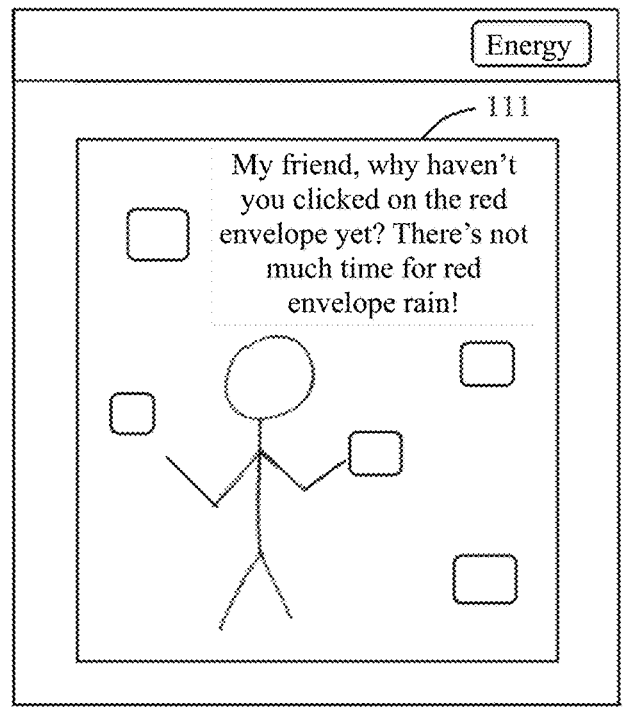
FIG. 7A shows a schematic diagram of displaying a second interactive video according to embodiments of the present disclosure.

FIG. 7A shows a schematic diagram of displaying the second interactive video according to the embodiment of the present disclosure, wherein, the semantics expressed in the second interactive video may be used to guide the user who has not clicked on the interacting control within the specified second time period to click on the interacting control; for example, the semantics expressed in the second interactive video may be "My friend, why haven't you clicked on the red envelope yet? There's not much time for red envelope rain!", and thereby implementing an interactive effect between the video content and the click operations. Based on the operation result that the user does not clicking on the interacting control, the displayed second interactive video may once again encourage and guide the user to participate in the activity by clicking on the interacting control.

The interacting method according to the embodiment of the present disclosure may further include: displaying a message of failing to acquire the resource, in a case where no trigger operation for the resource claiming component is detected within the display time period. The message of failing to acquire the resource is used to prompt the user that no resource reward is obtained.

Figure 7B:
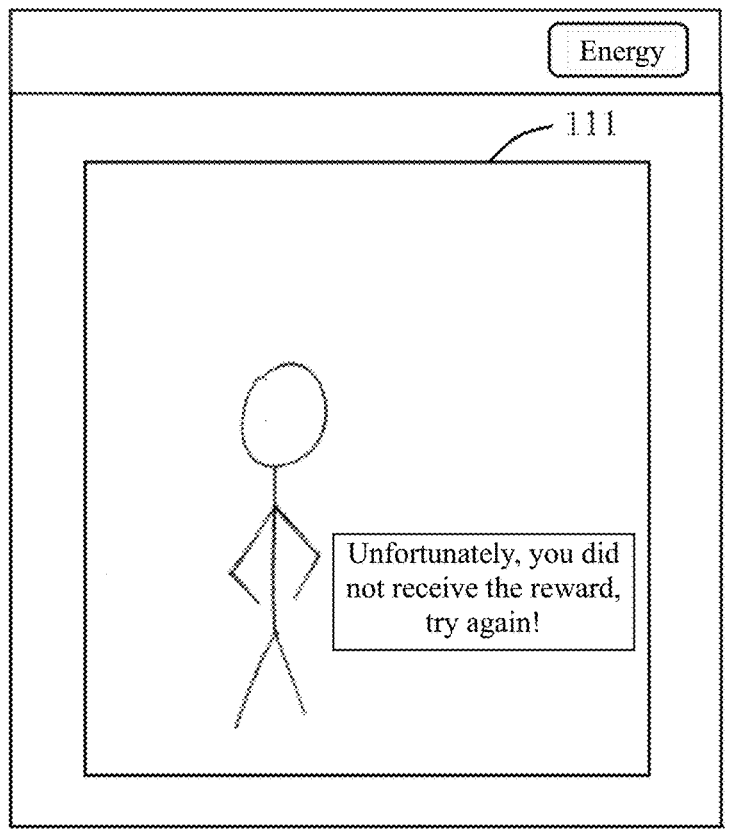
FIG. 7B shows a schematic diagram of displaying a message of failing to acquire a resource according to embodiments of the present disclosure.

FIG. 7B shows a schematic diagram displaying the message of failing to acquire the resource according to the embodiment of the present disclosure. As shown in FIG. 7B, the message may be displayed in a form of an information prompt box, and the prompt box may display a text message such as "Unfortunately, you did not receive the reward, try again!" Alternatively, in this case, a fifth interactive video may also be displayed; and the fifth interactive video may express in language the content of the message of failing to acquire the resource.

According to the resource interacting method provided by the embodiment of the present disclosure, the user's interaction procedure is added during the resource acquisition procedure, and the interactive content may be exhibited accordingly according to the user's trigger operation, that is, the content exhibited in the resource acquisition procedure is associated with the user's trigger operation, for example, different video data is displayed for different operation results, thereby implementing a combination of resource acquisition and display interaction, so as to enhance the user' sense of engagement while enhancing entertainment and attractiveness.

In addition, the displayed interactive video content may be further associated with attribute information of the user or the device; based on the received attribute information, for example, the server may correspondingly provide interactive data for resource acquisition interaction. By combining the attribute information with the video content, such a resource interaction mode may highlight attribute differences of the user, narrow a distance with the user, and is favorable for promoting the user to participate in the resource claiming activity not only because of attractiveness of the resource but also because of the video content he/she is interested in.

Figure 8:
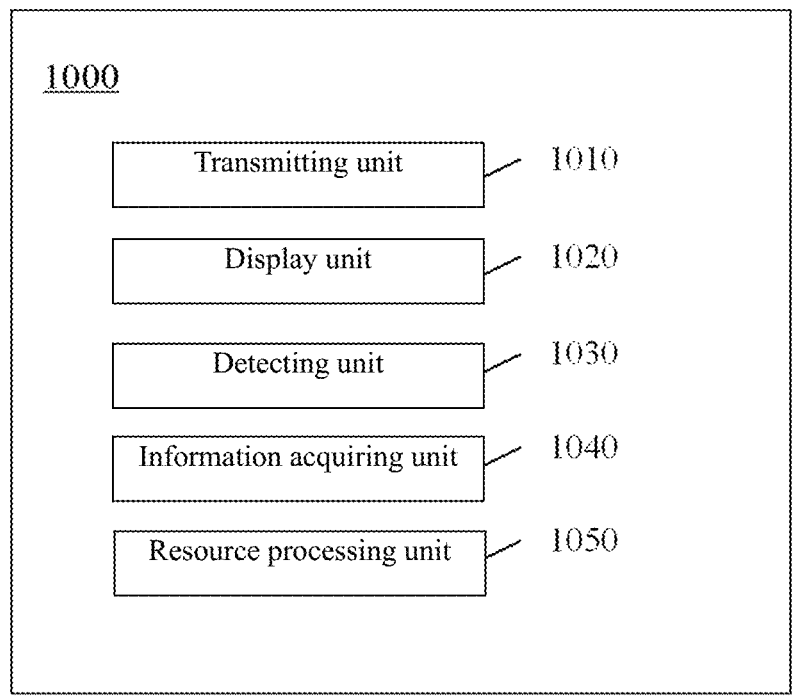
FIG. 8 shows a schematic block diagram of a resource interacting apparatus provided by the present disclosure.

According to another aspect of the present disclosure, there is further provided a resource interacting apparatus. FIG. 8 shows a schematic block diagram of a resource interacting apparatus provided by at least some embodiments of the present disclosure.

As shown in FIG. 8, the interacting apparatus 1000 may include: a transmitting unit 1010, a display unit 1020, and a detecting unit 1030. According to the embodiment of the present disclosure, the transmitting unit 1010 is configured to: acquire display data corresponding to user attribute information, wherein, the display data includes a resource interactive video and an associated interactive video. The user attribute information includes at least one of: user location information, festival information, user level information, and season information. The display unit 1020 may be configured to display a resource claiming component and a resource interactive video on an interactive page in response to a resource claiming trigger event, wherein, a content of the resource interactive video is associated with the resource claiming component. The detecting unit 1030 may be configured to detect a trigger operation result of the resource claiming component. Next, the display unit 1020 may be further configured to: display the associated interactive video corresponding to the trigger operation result within the interactive page.

According to some embodiments of the present disclosure, the detecting unit 1030 may be further configured to: detect a resource processing trigger event within the display page. The transmitting unit 1010 may be configured to send the resource acquisition request; and the resource acquisition request is used to request data related to the resource interaction procedure, for example, display data, etc. from an application server. Next, the transmitting unit 1010 may be further configured to receive interactive data, wherein, the interactive data includes display data and an exhibition instruction, and the exhibition instruction is used to indicate exhibition of the interactive page on the display page. For example, the display data includes at least one of: the resource interactive video and the associated interactive video. For example, after the terminal device detects the resource processing trigger event and sends the resource acquisition request to the application server based on the detection result, the server may correspondingly send data related to the resource interaction procedure to the terminal device, and cause the processing steps as described above to be performed in the terminal device.

According to some embodiments of the present disclosure, the resource processing trigger event may include at least one of: triggering a scheduled video within a display page, triggering an activity control within a display page, and displaying a scheduled video or an activity control at a predetermined time interval.

According to some embodiments of the present disclosure, the display unit 1020 may be further configured to display a guide interactive video of the resource claiming component before displaying the resource claiming component within the interactive page.

According to some embodiments of the present disclosure, the interacting apparatus 1000 may further include an information acquiring unit 1040; the information acquiring unit 1040 may be configured to acquire the user attribute information, for example, acquire attribute information of a terminal device or attribute information of an account logged in on the terminal device. As an example, the resource acquisition request may include the acquired user attribute information, in which case the received interactive data may be the interactive data associated with the attribute information. According to some embodiments of the present disclosure, the user attribute information includes at least one of: user location information, festival information, user level information, and season information.

According to other embodiments of the present disclosure, the transmitting unit 1010 may be further configured to: send the user attribute information in response to the received attribute information request. For example, the above-described server may send an attribute information request to the terminal device; and in response to the attribute information request, the terminal device may send the stored user attribute information or the currently acquired user attribute information (e.g., acquired by the information acquiring unit 1040) to the server. In this case, the received interactive data may be interactive data associated with the user attribute information. For example, the attribute information may be at least one of: location information, festival information, user level information, and season information.

According to some embodiments of the present disclosure, the resource claiming trigger event may include: a first time period set for the guide interactive video, wherein, in response to the resource claiming trigger event, the display unit 1020 is configured to display the resource claiming component and the resource interactive video within the interactive page after the first time period of displaying the guide interactive video.

According to some embodiments of the present disclosure, in a case where the trigger operation result is that the first operation result of the trigger operation for the resource claiming component is detected on the interactive page, the display unit 1020 is configured to display a first interactive video corresponding to the first operation result on the interactive page, wherein, a content of the first interactive video is used to encourage further triggering the resource claiming component.

According to some embodiments of the present disclosure, the detecting unit 1030 may be further configured to count the number of triggers for the resource claiming component on the interactive page within the display time period of the resource claiming component. Next, the display unit 1020 may cancel exhibition of the resource claiming component, display the resource acquisition object corresponding to the number of triggers; and display resource information in response to triggering the resource acquisition object. According to some embodiments of the present disclosure, the interacting apparatus 1000 may further include a resource processing unit 1050; and the resource processing unit 1050 may be configured to receive a resource corresponding to the resource information allocated by, for example, the server, so as to add the resource to a corresponding account.

According to other embodiments of the present disclosure, in a case where the trigger operation result is that the second operation result of the trigger operation for the resource claiming component is not detected within the second time period, the display unit 1020 is configured to display a second interactive video corresponding to the second operation result within the interactive page, wherein, a content of the second interactive video is used to guide triggering the resource claiming component. The detecting unit 1030 may be further configured to count the number of triggers for the resource claiming component on the interactive page within the display time period of the resource claiming component. Next, the display unit 1020 may cancel exhibition of the resource claiming component, and display a message of failing to acquire the resource in a case where no trigger operation for the resource claiming component is detected within the display time period. The message of failing to acquire the resource is used to indicate that the resource is not acquired.

As an implementation mode, the display unit 1020 may be implemented as a display panel; and optically, the display panel may be in a form of a Liquid Crystal Display (LCD), an Organic Light-Emitting Diode (OLED), etc. The display unit 1020 may be used to display information input by the user or information supplied to the user, as well as various graphical user interfaces; and these graphical user interfaces may be composed of graphics, text, icons, videos, and any combination thereof.

As an implementation mode, the detecting unit 1030 may be implemented as a touch sensitive surface or other input interface. The touch sensitive surface may also be referred to as a touch display screen or a touchpad, and is used to collect user's touch operations on or near the touch sensitive surface, for example, operations using any suitable object or accessory such as a finger or a stylus on or near the touch sensitive surface; and corresponding functional units are driven according to a preset program. Optionally, the touch sensitive surface may include two portions: a touch detecting apparatus and a touch controller. Wherein, the touch detecting apparatus detects a touch orientation of the user, detects a signal brought by a touch operation, and transmits the signal to the touch controller. The touch controller receives touch information from the touch detecting apparatus, converts the same into contact coordinates, then transmits the contact coordinates to, for example, a processing unit, and is capable of receiving an instruction sent by the processing unit and executing the same. In addition, a variety of types such as a resistive type, a capacitive type, an infrared type and a surface acoustic wave type may be used to implement the touch sensitive surface. In addition to the touch sensitive surface, the detecting unit 1030 may further include other input interfaces. Specifically, other input interfaces may include, but are not limited to, one or more of a physical keyboard, a function button (e.g., a volume control button, a switch button, etc.), a trackball, a mouse, a joystick, etc.

The touch sensitive surface of the detecting unit 1030 may cover the above-described display panel; when detecting a touch operation on or near the touch sensitive surface, the touch sensitive surface transmits the same to a processing unit to determine a type of the touch event; and subsequently, the processing unit may provide corresponding visual output on the display panel based on the type of the touch event.

As an implementation mode, the above-described processing unit may be implemented as a logical operation center of the terminal device, which links various functional units of the device by utilizing various interfaces and lines, executes various functions and processes data by running or executing software programs and/or modules stored in the memory, and calling data stored in the memory. Optionally, the processing unit may be implemented as one or more processing cores. For example, the processing unit may integrate an application processor and a modulation and demodulation processor, wherein, the application processor mainly processes an operating system, a user interface, and an application, etc., while the modulation and demodulation processor mainly processes wireless communication. It may be understood that the above-described modulation and demodulation processor may not be integrated into the processing unit.

t should be noted that in the resource-based interaction procedure performed by the interacting apparatus provided according to the embodiment of the present disclosure, it is only illustrated by taking division of the above-described respective functional units as an example; in practical application, the above-described functional units may be completed by different modules as needed, for example, dividing an internal structure of the terminal device into different units to complete all or some of the steps as described above. In addition, the interacting apparatus provided by the above-described embodiments may implement the steps of the resource interacting method provided according to the present disclosure; the method embodiments as described above may be referred to for a specific implementation procedure thereof, and no details will be repeated here.

Figure 9:
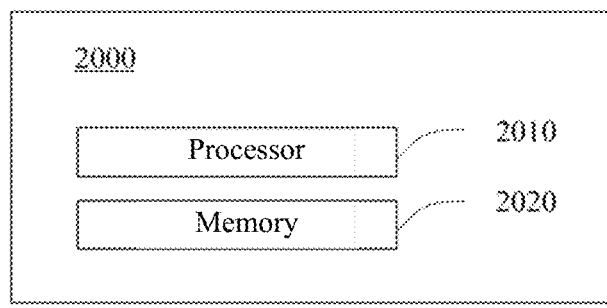
FIG. 9 shows a schematic block diagram of a computer device provided by the present disclosure.

According to still another aspect of the present disclosure, there is further provided a computer device; and FIG. 9 shows a schematic block diagram of a computer device according to embodiments of the present disclosure.

As shown in FIG. 9, the computer device 2000 may include a processor 2010 and a memory 2020, wherein, the memory 2020 has a computer program (e.g., program instructions, codes, etc.) stored thereon. The processor 2020 is capable of executing the computer program to implement the above-described steps of the resource interacting method. For example, the computer device 2000 may be a terminal device on which a user logs in his/her own account.

In at least one example, the processor 2010 may execute various actions and processes based on the computer programs stored in the memory 2020. For example, the processor 2010 may be an integrated circuit chip, and has signal processing capabilities. The above-described processor may be a general-purpose processor, a Digital Signal Processor (DSP), an Application Specific Integrated Circuit (ASIC), a Field Programmable Gate Array (FPGA) or other programmable logic device, a discrete gate or a transistor logic device, and a discrete hardware component. Various methods, steps, and logical block diagrams as described in the embodiments of the present disclosure may be implemented or executed. The general-purpose processor may be a microprocessor, or the processor any also be any conventional processor, etc., which may be of X86 architecture or ARM architecture, etc.

The memory 2020 stores a computer executable computer program; and when executed by processor 2010, the computer program may implement the resource interacting method provided according to the embodiments of the present disclosure. The memory 2020 may be a volatile memory or a non-volatile memory, or may include both the volatile memory and the non-volatile memory. The non-volatile memory may be a Read Only Memory (ROM), a Programmable Read Only Memory (PROM), an Erasable Programmable Read Only Memory (EPROM), an Electrically Erasable Programmable Read Only Memory (EEPROM) or a flash memory. The volatile memory may be a Random Access Memory (RAM), which is used as an external cache. By way of illustration but not limitation, many forms of RAM are available, for example, a Static Random Access Memory (SRAM), a Dynamic Random Access Memory (DRAM), a Synchronous Dynamic Random Access Memory (SDRAM), a Double Data Rate Synchronous Dynamic Random Access Memory (DDRS-DRAM), an Enhanced Synchronous Dynamic Random Access Memory (ESDRAM), a Synchronous Link Dynamic Random Access Memory (SLDRAM), and a Direct Rambus Random Access Memory (DRRAM). It should be noted that the memories as described herein are intended to include, but are not limited to, these and any other suitable types of memories.

According to other embodiments of the present disclosure, the computer device 2000 may further include a display (not shown) to implement visualization for operators such as computer operators. For example, the interactive content, controls, and data processing results during implementation of the above-described interacting method may be displayed on the display, or the computer program may also be displayed, which will not be limited here. In addition, the computer device 2000 may further include necessary components such as an interactive interface, an input device, a communicating unit, etc., for implementing information exchange between the computer and the operator, and between other devices; for example, the operator may modify the computer program through the input device.

Figure 10:
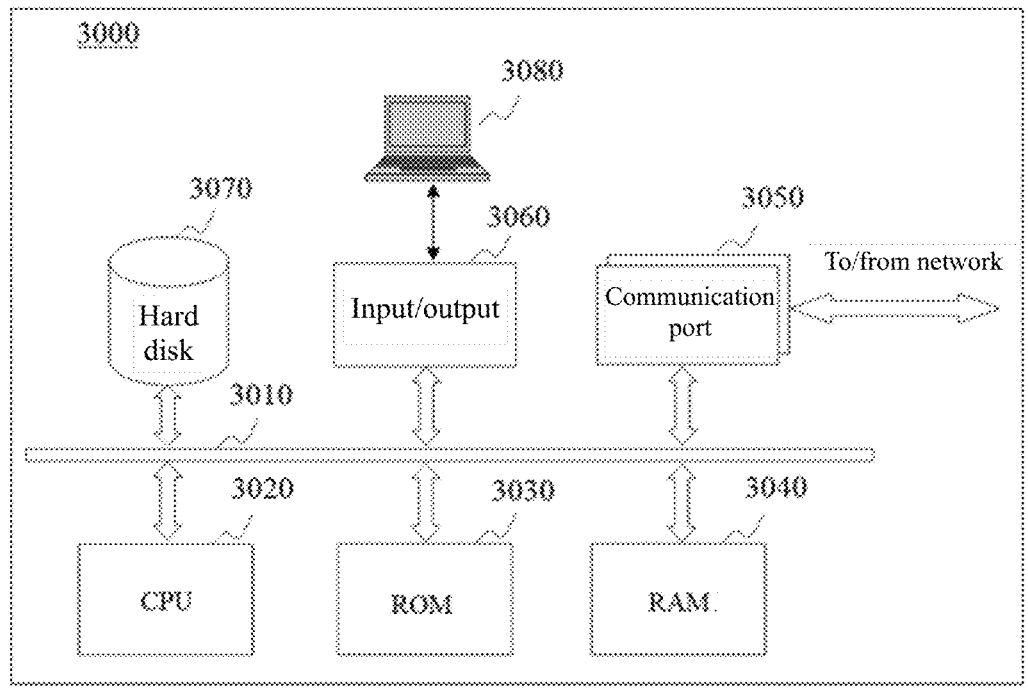
FIG. 10 shows an architectural schematic diagram of an exemplary computing device according to embodiments of the present disclosure.

As an exemplary implementation mode, the apparatus 1000 or the computer device 2000 according to the present disclosure may be implemented as a computing device as shown in FIG. 10.

FIG. 10 shows an architectural schematic diagram of an exemplary computing device according to embodiments of the present disclosure. The computing device 3000 may include a bus 3010, one or more CPU 3020, a Read-Only Memory (ROM) 3030, a Random Access Memory (RAM) 3040, a communication port 3050 coupled to a network, an input/output component 3060, a hard disk 3070, etc. A storage device in the computing device 3000, for example, the ROM 3030 or the hard disk 3070, may store various data or files as well as computer programs executed by the CPU, involved in processing and/or communication of the resource interacting method provided by the present disclosure. The computing device 3000 may further include a user interface 3080, for example, the user interface may be used to display received interactive content and interacting controls, and may also receive user operations through a touch sensitive device thereon. Of course, the architecture shown in FIG. 10 is only schematic; when implementing different devices, according to actual needs, one or more components in the computing device shown in FIG. 10 may be omitted, or required components may be added on the basis of the computing device shown in FIG. 10, which will not be limited here.

Figure 11:
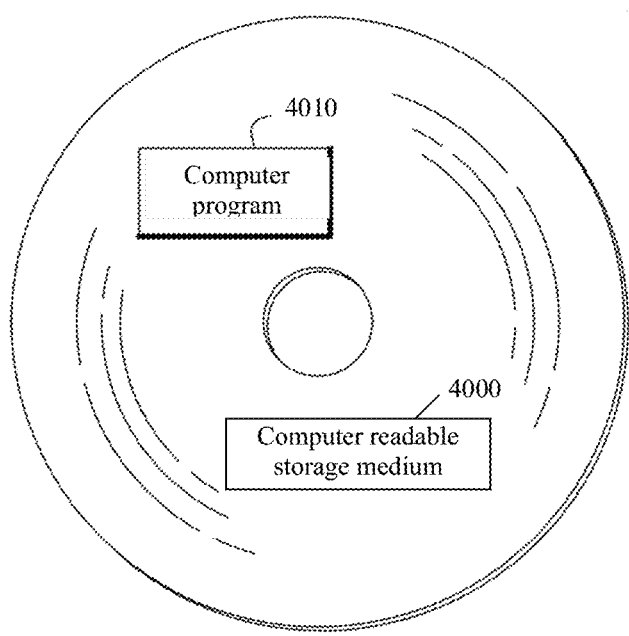
FIG. 11 shows a schematic block diagram of a computer readable storage medium provided by the present disclosure.

According to yet another aspect of the present disclosure, there is further provided a computer readable storage medium; and FIG. 11 shows a schematic block diagram of a computer readable storage medium provided by the present disclosure.

As shown in FIG. 11, the computer readable storage medium 4000 has a computer program 4010 stored thereon, wherein, when executed by the processor, the computer program 4010 implements the steps of the above-described resource interacting method. In at least one example, the computer readable storage medium 4000 includes but is not limited to a volatile memory and/or a non-volatile memory. The volatile memory may include, for example, a Random Access Memory (RAM) and/or a cache, etc. The non-volatile memory may include, for example, a Read-Only Memory (ROM), a hard disk, a flash memory, etc. For example, the computer readable storage medium 4000 may be coupled to a computing device such as a computer (e.g., as shown in FIG. 10). Next, when the computing device runs the computer program 4010 stored on the computer readable storage medium 4000, the interacting method provided by the present disclosure may be performed.

According to yet another aspect of the present disclosure, there is further provided a computer program product, including a computer program. In at least one example, when executed by the processor, the computer program may implement the steps of the above-described resource interacting method.

By using the resource interacting method and the apparatus, the computer device, and the readable storage medium provided according to the embodiments of the present disclosure, the interaction effect with the user is increased through the set interactive video during the resource acquisition procedure, that is, the video displayed within the page is associated with the resource acquisition procedure, and the content of the displayed video is related to the user's operations; interactive videos with different contents are displayed for different operation results, such that the interactive videos may be exhibited accordingly based on user's trigger operations. That is, the videos exhibited during the resource acquisition procedure are associated with the user's trigger operations; for example, different video data is displayed for different operation results, to implement a combination of resource acquisition and display interaction, thereby enhancing the user's sense of participation while enhancing entertainment and attraction. In addition, the displayed video content is also associated with the user attribute information, and such a resource interaction mode may highlight attribute differences between users, narrow a distance with the user, and is favorable for promoting the user to participate in the resource claiming activity not only because of attractiveness of the resource but also because of the video content he/she is interested in.

Technicians in this field can understand that the content disclosed in this disclosure can have various variations and improvements. For example, the various devices or components described above can be implemented through hardware, software, firmware, or some or all of the three in combination.

Furthermore, although various references have been made to certain units in the system according to the disclosed embodiments, any number of different units can be used and run on clients and/or servers. Units are only illustrative, and different aspects of systems and methods can use different units.

A flowchart is used in this disclosure to illustrate the steps of a method according to the disclosed embodiment. It should be understood that the steps before or after may not be carried out precisely in order. On the contrary, various steps can be processed in reverse order or simultaneously. At the same time, other operations can also be added to these processes.

Ordinary technical personnel in this field can understand that all or part of the steps in the above methods can be completed by instructing the relevant hardware through computer programs, which can be stored in computer-readable storage media, such as read-only memory, magnetic disks, or optical disks. Optionally, all or part of the steps of the above embodiments can also be implemented using one or more integrated circuits. Correspondingly, the modules/units in the above embodiments can be implemented in the form of hardware or software functional modules. This disclosure is not limited to any specific form of combination of hardware and software.

Unless otherwise defined, all techniques used herein have the same meaning as those commonly understood by ordinary technical personnel in the field to which this disclosure belongs. It should also be understood that terms such as those defined in regular dictionaries should be interpreted as having meanings that are consistent with their meanings in the context of the relevant technology, and should not be interpreted in idealized or overly formal terms, unless explicitly defined here.

The above is an explanation of this disclosure and should not be considered as a limitation. Although several exemplary embodiments of the present disclosure have been described, those skilled in the art will easily understand that many modifications can be made to the exemplary embodiments without departing from the novel teaching and advantages of the present disclosure. Therefore, all these modifications are intended to be included within the scope of this disclosure as limited by the claims. It should be understood that the above is an explanation of the present disclosure and should not be considered limited to the specific embodiments disclosed, and the intention to modify the disclosed embodiments and other embodiments is included within the scope of the attached claims.

The above is only an exemplary implementation of this disclosure, and is not intended to limit the scope of protection of this disclosure. The scope of protection of this disclosure is determined by the attached claims.

The invention claimed is:

1. A resource interacting method, comprising:
   acquiring display data corresponding to user attribute information, wherein, the display data comprises a resource interactive video and an associated interactive video;
   displaying a resource claiming component and the resource interactive video within an interactive page in response to a resource claiming trigger event, wherein, a content of the resource interactive video is associated with the resource claiming component;
   detecting a trigger operation result for the resource claiming component; and
   displaying the associated interactive video corresponding to the trigger operation result within the interactive page,
   wherein, in a case where the trigger operation result is that a first operation result of the trigger operation for the resource claiming component is not detected within a first time period, the displaying the associated interactive video corresponding to the trigger operation result within the interactive page, comprises:
   displaying a first interactive video corresponding to the first operation result within the interactive page, a content of the first interactive video being used to guide triggering the resource claiming component.

2. The method according to claim 1, further comprising:
   detecting a resource processing trigger event;
   sending a resource acquisition request;
   receiving interactive data, wherein, the interactive data comprises display data and an exhibition instruction; and the exhibition instruction is used to indicate exhibition of the interactive page on the display page.

3. The method according to claim 2, wherein, the resource processing trigger event comprises at least one of:
   triggering a scheduled video within the display page;
   triggering an activity control within the display page; and
   displaying the scheduled video or the activity control at a predetermined time interval.

4. The method according to claim 1, wherein, the user attribute information comprises at least one of: user location information, festival information, user level information, and season information.

5. The method according to claim 1, wherein, in a case where the trigger operation result is that a second operation result of the trigger operation for the resource claiming component is detected on the interactive page, the displaying the associated interactive video corresponding to the trigger operation result within the interactive page, comprises:
   displaying a second interactive video corresponding to the second operation result within the interactive page, a content of the second interactive video being used to encourage further triggering the resource claiming component.

6. The method according to claim 5, further comprising:
   counting the number of triggers for the resource claiming component on the interactive page, within the display time period of the resource claiming component;
   cancelling exhibition of the resource claiming component;
   displaying the resource acquisition object corresponding to the number of triggers;
   displaying resource information, in response to triggering the resource acquisition object; and
   adding a resource corresponding to the resource information to an account.

7. The method according to claim 1, further comprising:
   counting the number of triggers for the resource claiming component on the interactive page, within the display time period of the resource claiming component;
   cancelling exhibition of the resource claiming component;
   displaying a message of failing to acquire the resource, in a case where no trigger operation for the resource claiming component is detected within the display time period.

8. A resource interacting apparatus, comprising:
   a transmitting unit, configured to acquire display data corresponding to user attribute information, wherein, the display data comprises a resource interactive video and an associated interactive video;
   a display unit, configured display a resource claiming component and a resource interactive video on an interactive page in response to a resource claiming trigger event, wherein, a content of the resource interactive video is associated with the resource claiming component;
   a detecting unit, configured to detect a trigger operation result for the resource claiming component;
   wherein, the display unit is further configured to: display an associated interactive video corresponding to the trigger operation result within the interactive page,
   wherein, in a case where the trigger operation result is that a first operation result of the trigger operation for the resource claiming component is not detected within a first time period, the displaying the associated interactive video corresponding to the trigger operation result within the interactive page, comprises:

displaying a first interactive video corresponding to the first operation result within the interactive page, a content of the first interactive video being used to guide triggering the resource claiming component.

9. The apparatus according to claim 8, wherein, the detecting unit is further configured to detect a resource processing trigger event;
the transmitting unit is further configured to send a resource acquisition request, and receive interactive data, the interactive data comprising the display data and an exhibition instruction, and the exhibition instruction being used to indicate exhibition of the interactive page on the display page.

10. The apparatus according to claim 9, wherein, the resource processing trigger event comprises at least one of:
triggering a scheduled video within the display page;
triggering an activity control within the display page; and
displaying the scheduled video or the activity control at a predetermined time interval.

11. The apparatus according to claim 8, wherein, the user attribute information comprises at least one of: user location information, festival information, user level information, and season information.

12. The apparatus according to claim 8, wherein, in a case where the trigger operation result is that a second operation result of the trigger operation for the resource claiming component is detected on the interactive page, the displaying, by the display unit, the associated interactive video corresponding to the trigger operation result within the interactive page, comprises:
displaying a second interactive video corresponding to the second operation result within the interactive page, a content of the second interactive video being used to encourage further triggering the resource claiming component.

13. The apparatus according to claim 12, wherein, the detecting unit is further configured to count the number of triggers for the resource claiming component on the interactive page within the display time period of the resource claiming component;
the display unit is further configured to:
cancel exhibition of the resource claiming component;
display the resource acquisition object corresponding to the number of triggers; and
display resource information, in response to triggering the resource acquisition object;
the apparatus further comprises a resource processing unit, which is configured to:
add a resource corresponding to the resource information to an account.

14. A computer device, comprising a processor, a memory, and a computer program stored on the memory, wherein, the processor executes the computer program to implement:
acquiring display data corresponding to user attribute information, wherein, the display data comprises a resource interactive video and an associated interactive video;
displaying a resource claiming component and the resource interactive video within an interactive page in response to a resource claiming trigger event, wherein, a content of the resource interactive video is associated with the resource claiming component;

detecting a trigger operation result for the resource claiming component; and
displaying the associated interactive video corresponding to the trigger operation result within the interactive page,
wherein, in a case where the trigger operation result is that a first operation result of the trigger operation for the resource claiming component is not detected within a first time period, the displaying the associated interactive video corresponding to the trigger operation result within the interactive page, comprises:
displaying a first interactive video corresponding to the first operation result within the interactive page, a content of the first interactive video being used to guide triggering the resource claiming component.

15. A non-transitory computer readable storage medium, wherein the computer readable storage medium has a computer program stored thereon, wherein, the computer program implements, upon executed by a processor, the steps of the method according to claim 1.

16. The apparatus according to claim 8, wherein:
The detecting unit is further configured to count the number of triggers for the resource claiming component on the interactive page, within the display time period of the resource claiming component;
the display unit is further configured to cancel exhibition of the resource claiming component, and display a message of failing to acquire the resource, in a case where no trigger operation for the resource claiming component is detected within the display time period.

17. The method according to claim 1, further comprising:
displaying a guide interactive video of the resource claiming component, before the displaying the resource claiming component within the interactive page.

18. The method according to claim 17, wherein, the resource claiming trigger event comprises: a second time period set for the guide interactive video,
the displaying a resource claiming component and the resource interactive video within an interactive page in response to a resource claiming trigger event, comprises:
displaying the resource claiming component and the resource interactive video within the interactive page, after the second time period of displaying the guide interactive video.

19. The apparatus according to claim 8, wherein, the display unit is further configured to:
display a guide interactive video of the resource claiming component before displaying the resource claiming component within the interactive page.

20. The apparatus according to claim 19, wherein, the resource claiming trigger event comprises: a second time period set for the guide interactive video,
the displaying, by the display unit, a resource claiming component and the resource interactive video within an interactive page in response to a resource claiming trigger event, comprises:
displaying the resource claiming component and the resource interactive video within the interactive page, after the second time period of displaying the guide interactive video.

* * * * *